R. F. LEFTWICH.
AUTOMATIC HOSE COUPLING.
APPLICATION FILED AUG. 18, 1916.
1,263,574.
Patented Apr. 23, 1918.
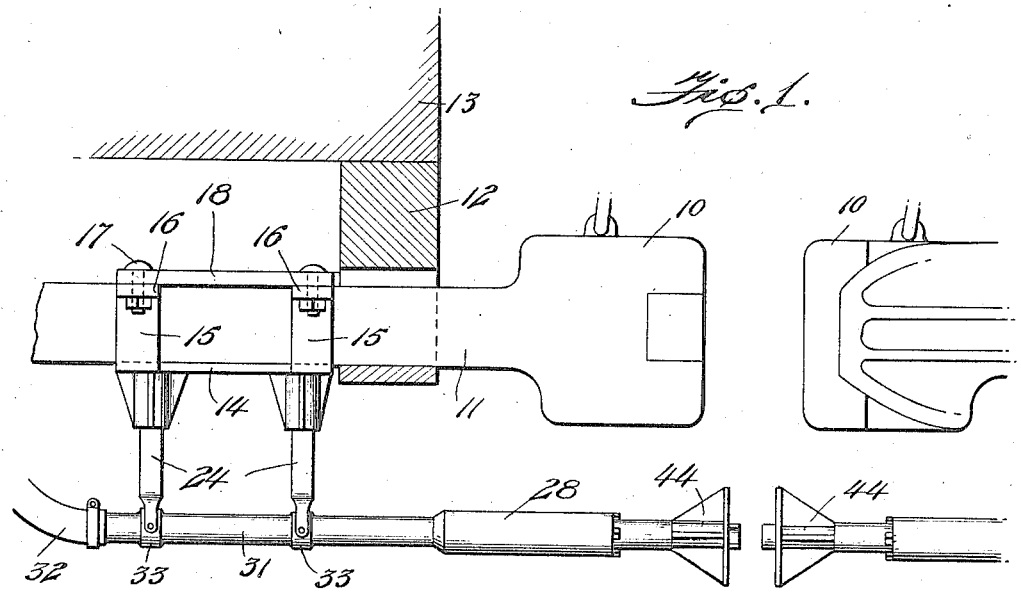
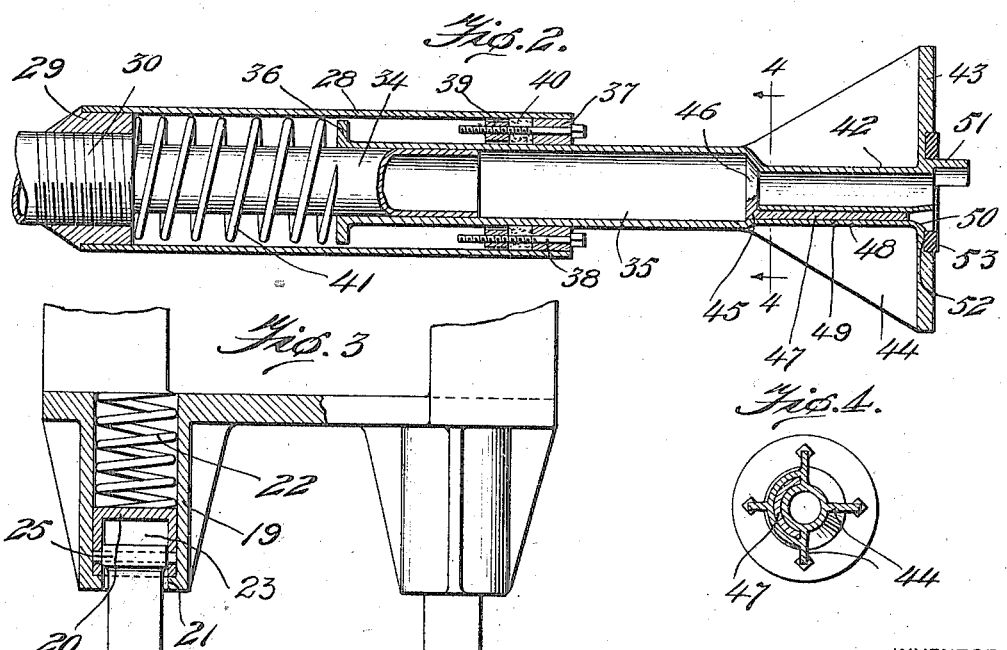
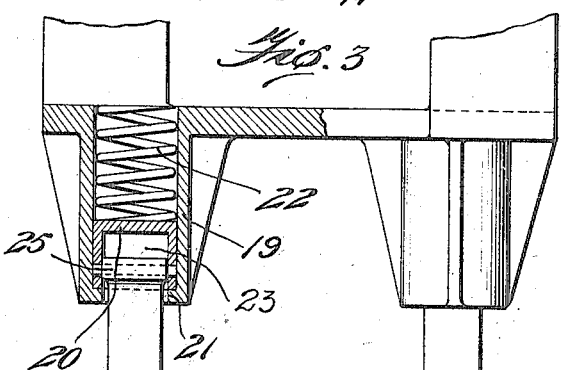
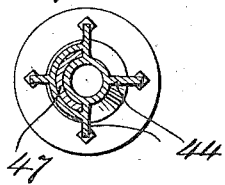
WITNESSES
INVENTOR
Robert Frank Leftwich
BY
ATTORNEY

UNITED STATES PATENT OFFICE.

ROBERT FRANK LEFTWICH, OF MOBILE, ALABAMA.

AUTOMATIC HOSE-COUPLING.

1,263,574. Specification of Letters Patent. Patented Apr. 23, 1918.

Application filed August 18, 1916. Serial No. 115,617.

*To all whom it may concern:*

Be it known that I, ROBERT FRANK LEFTWICH, a citizen of the United States, residing at Mobile, in the county of Mobile and State of Alabama, have invented certain new and useful Improvements in Automatic Hose-Couplings, of which the following is a specification.

This invention has relation to air brake couplings for railway cars or the like, and the nature and objects thereof will be readily apparent to those skilled in the art to which it appertains in the light of the following explanation of the accompanying drawings, illustrating what I now believe to be the preferred embodiment, or mechanical expression, of my invention, from among other forms and arrangements within the spirit thereof, or the scope of the appended claims.

However, an object of the invention is to provide complemental members of an air brake coupling, each adapted for association with the car coupler of a railway car whereby the act of interengaging the car coupler members may serve to centralize the members of the air brake coupling to position them for proper engagement when the cars are brought together.

Another object of the invention is to provide in an air brake coupling of the character above set forth, a suspension means for suspending the complemental members of the coupling beneath their respective car coupling so as to permit lateral movement of said complemental members of the air brake coupling whereby to dispose the said complemental members in longitudinal alinement when the cars to be coupled are resting upon a transversely inclined track thereby disposing the center of gravity to one side or the other of the base of the cars.

A still further object of the invention is to provide, in an air brake coupling, means for permitting relative longitudinal movement of the complemental members of the coupling, with means for resiliently resisting such movement, whereby upon engagement of the members of the coupling said resilient means may be placed under tension to maintain the coupling members in secure engagement.

A still further object of the invention is to provide, in an air brake coupling of the character above set forth and having means for permitting relative longitudinal movement of the complemental members of the coupling, means whereby the pressure of the train line may be utilized to assist the above mentioned resilient means in maintaining the complemental members of the coupling in secure engagement.

A still further object of the invention is to provide an air brake coupling including complemental members one of which is associated with each car, and having a new and novel suspension means, whereby each member of the coupling may be suspended beneath its respective car coupling, and adapted for relative vertical movement in alinement, or parallelism, as well as for lateral movement.

In addition to the foregoing, my invention comprehends improvements in the details of construction and arrangement of parts, to be hereinafter more fully described and particularly pointed out in the appended claims.

In the accompanying drawings in which similar and corresponding parts are designated by the same characters of reference throughout the several views in which they appear:

Figure 1, is a view in side elevation of a pair of complemental couplings of an air brake coupling, constructed after the manner of my invention, and illustrating its application to a conventional type of car coupling.

Fig. 2, is a longitudinal section on an enlarged scale taken through one of the members of my improved air brake coupling.

Fig. 3, is a detail view in section, with parts in elevation of the arrangement for suspending one of the members of the air brake coupling beneath a car coupling.

Fig. 4, is a vertical transverse section taken on the line 4—4 of Fig. 2, and

Fig. 5, is a detail view of a support forming a part of the suspension means.

With reference to the drawings, and particularly Fig. 1, thereof, 10 indicates the head of a conventional car coupling provided with the inwardly extending draw bar 11 which extends longitudinally and beneath the car, and mounted for slight sliding movement in a transverse beam 12, secured beneath the car body indicated in part at 13.

My invention is adapted to be associated with the car coupling, and comprises a plate 14, disposed beneath the draw bar 11 and having at each end of said plate, transversely spaced, vertically extending extensions 15, adapted to closely engage the vertical sides of the draw bar 11, said members 15 having outwardly extended upper terminals 16, apertured to receive bolts 17 which serve to clamp to said extensions a top plate 18, which is adapted to rest upon the top surface of the draw bar. In this manner the plate 14 is securely held to the draw bar and adapted for movement therewith. Adjacent each end of the lower plate 14, in longitudinal spaced relation, and in alinement, are depending integrally formed cylindrical members 19, having vertical bores in which is mounted for vertical movement a cylindrical block 20, the cylindrical members 19 forming a guide therefor. Each of the guide members 19 is provided with an annular shoulder 21 at its lower end extending inwardly, to limit the downward movement of the block 20, said block being urged toward such position by means of a coil spring 22 disposed within the guide member and adapted to bear at its lower end upon said block, and at its upper end against the lower surface of the draw bar 11.

Each block 20 is formed with a cavity 23, and a pin which extends through said block, the pins being disposed longitudinally of the car. A depending bar 24 is provided for each block 20, said bars 24 having apertured enlargements 25 at their upper ends to receive the aforesaid pins, the lower ends of the said bars being bifurcated as at 26, the extremities of the bifurcations being formed with inwardly extending trunnions 27 disposed in alinement and transversely of the car.

To proceed with a description of the coupling members proper, attention is called to Fig. 2 of the drawings, wherein the details of construction are illustrated to best advantage. Each coupling is a duplicate of the other, and a description of one will suffice for all, therefore. 28 indicates a tubular member having a plug 29 at one end internally threaded to receive the correspondingly threaded end 30, of a tubular member 31 having connection at its opposite end to the train pipe 32. The tubular member 31 is provided with longitudinally spaced enlargements 33 having diametrically opposed recesses designed to receive the trunnions 27 of the suspension means described above. In this manner the tubular member is suspended beneath the car coupling, and preferably to dispose the first mentioned tubular member 28 beneath the head of the car coupler. The tubular member 31 is formed with a forwardly extending reduced tubular extension 34, which extends within the tubular member 28 in circumferentially spaced relation, and a sliding tubular member 35 is adapted for telescopic engagement over the extension 34 and to partly extend beyond the forward terminal of the casing member 28. The rear end of the telescoping member 35 is flared outwardly to form an annular flange 36. The forward end of the casing member 28 is provided with an annular plug 37 having central aperture in which the telescoping member 35 is guided, and diametrically opposed transversely extending openings for the reception of bolts 38, which are adapted to pass the threaded openings in an annular packing compression member 39, disposed within the casing member 28. Compressible packing, indicated at 40 is filled in between the members 37 and 39 and upon rotating the bolts to draw the said member 39 to the member 37, the packing will obviously be compressed to tightly engage the interior of the casing 28, and the exterior surface of the telescoping member 35, thereby effecting a tight joint, and precluding the escape of air from the casing. A coil spring 41 encircles the tubular extension 34 and is disposed between the plug 29 and the flange 36, to urge the telescoping member 35 toward the opposite end of the casing member 28.

The end of the telescoping member 35 opposite the flange 36 thereof, is formed with a reduced tubular extension 42 forming a portion of the head of the coupling, the extremity of the said reduced extension being formed with an annular flange 43, integrally formed webs being provided for bracing said flange, against the impact which results when the coupling heads are brought into engagement. The telescoping member 35 is formed at its point of connection with the extension 42 with a valve seat indicated at 45 for the reception of a conical valve 46 which is provided adjacent its periphery with a valve stem 47, the same being substantially semi-circular in cross section and mounted for sliding movement in a longitudinal enlargement 48 of the extension 42, which enlargement is formed with an opening 49, to receive the valve stem. The opening 49 is flared outwardly at its forward end as indicated at 50, and coincides with an opening formed in the face of the flange 43. At a point diametrically opposite the opening 50, the flange 43 is provided with a semi-circular integrally formed extension 51 which extends beyond the face of the flange 43, and is adapted to enter the flared opening 50 of the complemental coupling head. An annular recess 52 is formed in the face of the flange 43, concentrically with relation to the wall of the extension 42, and a heavy gasket or the like 53 is disposed in said recess to form a tight joint with the corresponding gasket of the complemental coupling heads when the same are brought into engagement.

In practice, a coupling member, such as that just described is suspended beneath each coupler of a car, in such a manner as to dispose the semi-circular valve stem engaging members 51 in opposed relation at each end of the car, whereby upon engagement of the complemental members of adjacent ends of a car, the valve stem engaging member 51 may enter the flared opening 50 of the opposite coupling member. Obviously, when said engagement takes place upon interengagement of the coupling members, the valve 46 of each coupling member is unseated, thereby establishing communication between the interior of the telescopic members 34, the tubular member 31, and the train line 32, to permit the building up of train line pressure therewithin preparatory to a release of the brakes. During engagement of the complemental members of the couplings, the flanges 43 are adapted for close engagement, the engagement of the gasket 53 of each coupling insuring a tight joint to prevent the escape of train line pressure.

An important feature of the present invention, resides in the provision of the suspension means for the members of the coupling whereby said members are movable relatively to each other in various directions, thereby permitting the disposal of the members of the coupling in proper relation preparatory to causing engagement therebetween. The suspension means also permits a more or less flexible movement of the coupling when the train is rounding curves, passing over the crest of an elevation, or through the trough of a grade, whereby the members of the coupling are retained in proper engagement at all times.

Upon reference to Fig. 1 of the drawings, it will be obvious that when the train is passing the crest of an elevation the coupling heads of the air brake coupling would tend to separate were it not for the provision of the suspension means embodied in the present invention. It will be noted that in a contingency of this character, the blocks 20 located in the guides 19 are capable of relative vertical movement, and any tendency to dispose the complemental members of the air brake coupling out of alinement will be compensated for and taken care of by the supporting blocks 20 thereof which move vertically in their guides to automatically retain the coupling members in alinement. It will also be obvious, that when the train is rounding a curve, the alinement of the members of the air brake coupling is maintained by reason of the supporting members 24 thereof which are adapted for lateral oscillation, the blocks 20 being circular are also permitted to have slight rotative movement to permit the coupling members to be moved out of alinement with the center line of the train, during the time that the train is rounding a curve, while maintaining the members of the coupling in engagement, and permitting the coupling to return to alinement with the center of the train after the curve has been passed. Thus it will be seen that every movement of one car relative to the other is compensated for by the suspension means so as to preclude separation of members of the air brake coupling, and to assist them in maintaining their close and proper engagement at all times. It will be noted that the spring 41 tends to urge the telescopic member 35 carrying the head of the coupling member outward, thereby acting in opposition to the spring of the complemental member, the said members being thereby maintained in engagement. The train line pressure upon the inner surface of the valve 46 is also added to the tension of the spring 41 to urge the coupling head outward, said parts though only acting at such times as the said valve is closed.

While I have illustrated and described my invention with some degree of particularity, I realize that in practice various alterations thereover may be made, and I therefore reserve the right and privilege of changing the form of the details of construction or otherwise altering the arrangement of the correlated parts without departing from the spirit of the invention, or the scope of the appended claims.

Having thus described my invention what I claim as new and desire to secure by Letters Patent is:

1. The combination with a car coupling of an air brake coupling including engageable complemental coupling heads, each head including a tubular extension adapted for connection with the train line, and means for suspending each tubular member beneath a member of the car coupling including vertical guides associated with the car coupling member in longitudinally spaced relation, blocks movable vertically in said guides, supporting members pivoted to said blocks for transverse oscillation, and means for pivotally connecting the lower ends of said supports to the tubular member.

2. The combination with a car coupling of an air brake coupling including engageable complemental coupling heads each having a tubular extension adapted for connection to the train line, and means for suspending each tubular member beneath a member of the car coupling including cylindrical guides depending from the car coupling member in longitudinally spaced relation, cylindrical blocks mounted for rotation and vertical movement in said guides, resilient means in said guides urging said blocks downward, supporting bars suspended from each of said blocks for transverse oscillation, and means pivotally connecting the lower ends of said supporting bars to the tubular member of the air brake coupling thereby permitting vertical movement of said tubular member while maintaining the same in a horizontal plane, also permitting vertical and lateral oscillation thereof.

3. An air brake coupling including engageable complemental coupler heads, each having an air conduit for communication with the train pipe, a valve in each conduit for controlling the passage of air therethrough, and adapted to be held in normally seated position by fluid pressure within the train line, a stem projecting forward from each valve, and an abutment on each coupling adapted for engaging the valve stem of the opposite coupling when said coupling has been brought into engagement to unseat the valves and thereby establish communication between the sections of the train line through the coupler heads.

4. An air brake coupling including engageable complemental coupler heads, each having an air conduit for communication with the train pipe and a passage extending parallel to the conduit with one end in communication with the conduit and the other end in communication with the atmosphere at the end of the coupler heads, a valve in each conduit for controlling the passage of air therethrough, a stem on each valve for positioning in the passage, and an abutment on each coupling head adapted to enter the passage of an adjacent coupler to engage the stem of the opposite coupling head when said couplings are brought into engagement to unseat the valve and thereby establish communication between the sections of the train line through the coupler heads.

5. An air brake coupling including engageable complemental coupler heads, each having an air conduit for communication with the train line and a parallel semi-circular passage communicating at one end with the interior of the conduit and the other end with the atmosphere at the end of the coupling head, a valve in each conduit for controlling the passage of air therethrough, a semi-circular stem on each valve for positioning in the passage, and a semi-circular abutment on each coupling head adapted to enter the recess of the adjacent coupling head to engage the stem and unseat the valve when the coupling heads are brought together, whereby to establish communication between the sections of the train through the coupler heads.

6. The combination with a car coupling of an air brake coupling including engageable complemental coupling heads, having a plurality of pairs of opposed openings, a base plate secured to the under side of each car coupling, a pair of depending cylindrical members formed in longitudinally spaced relation on each base plate, a vertically movable member held within each cylinder, a longitudinally extending pin mounted in each member, a bar pivotally mounted on each pin for oscillation transversely of the car, the lower end of each bar being bifurcated, a trunnion on each bifurcation to enter the openings of the coupling heads, and a coil spring in each cylinder for urging the members contained therewithin downward and to resist upward movement thereof whereby to retain the coupling heads in normal horizontal position and to permit vertical movement thereof while maintaining said horizon position and to permit vertical oscillatory movement of said coupling heads.

In testimony whereof I affix my signature in presence of two witnesses.

ROBERT FRANK LEFTWICH.

Witnesses:
M. E. JONES,
RICHARD B. OWEN.

Copies of this patent may be obtained for five cents each, by addressing the "Commissioner of Patents, Washington, D. C."